United States Patent
Aruga

(10) Patent No.: US 10,082,671 B2
(45) Date of Patent: Sep. 25, 2018

(54) HEAD-MOUNTED DISPLAY, METHOD OF CONTROLLING HEAD-MOUNTED DISPLAY AND COMPUTER PROGRAM TO MEASURE THE DISTANCE FROM A USER TO A TARGET

(71) Applicant: SEIKO EPSON CORPORATION, Tokyo (JP)

(72) Inventor: Naoto Aruga, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 68 days.

(21) Appl. No.: 14/990,417

(22) Filed: Jan. 7, 2016

(65) Prior Publication Data

US 2016/0210736 A1 Jul. 21, 2016

(30) Foreign Application Priority Data

Jan. 20, 2015 (JP) ................................. 2015-008301

(51) Int. Cl.
*G02B 27/01* (2006.01)
*H04N 13/04* (2006.01)
*G06F 3/01* (2006.01)

(52) U.S. Cl.
CPC .......... *G02B 27/0172* (2013.01); *G06F 3/011* (2013.01); *H04N 13/044* (2013.01); *H04N 13/0497* (2013.01); *G02B 2027/014* (2013.01); *G02B 2027/0138* (2013.01)

(58) Field of Classification Search
CPC .............. G02B 27/0172; G02B 27/017; G02B 27/0101; G02B 2027/0138; G02B 2027/014; G06T 7/004; G06T 7/0051; G06T 9/006; G06F 3/017; H04N 13/044
USPC .................................. 345/8, 53, 633; 348/53
See application file for complete search history.

(56) References Cited

U.S. PATENT DOCUMENTS

| 2002/0097906 A1* | 7/2002 | Ishiyama | G06K 9/00268 382/154 |
| 2008/0024523 A1* | 1/2008 | Tomite | G06T 15/50 345/632 |
| 2011/0140994 A1* | 6/2011 | Noma | G02B 27/017 345/8 |
| 2012/0127284 A1* | 5/2012 | Bar-Zeev | G02B 27/017 348/53 |
| 2012/0242560 A1* | 9/2012 | Nakada | G09G 3/3406 345/8 |

(Continued)

FOREIGN PATENT DOCUMENTS

JP 2000-102040 A 4/2000
JP 2011-191905 A 9/2011

*Primary Examiner* — Jennifer Mehmood
*Assistant Examiner* — James Nokham
(74) *Attorney, Agent, or Firm* — Oliff PLC

(57) ABSTRACT

A head-mounted display includes: a distance measurement unit that measures a distance to a target present in a predetermined range; an imaging unit that images the predetermined range and acquires different preliminary information from the measured distance; and a distance decision unit that decides a distance to the target included in a second region based on the preliminary information acquired in regard to the target included in a measured first region when the first region and the second region different from the first region are included in the predetermined range in which the target is imaged.

13 Claims, 10 Drawing Sheets

(56) References Cited

U.S. PATENT DOCUMENTS

| | | | |
|---|---|---|---|
| 2012/0302289 A1* | 11/2012 | Kang | G06F 3/011 |
| | | | 455/557 |
| 2012/0327189 A1 | 12/2012 | Muramatsu et al. | |
| 2013/0088413 A1* | 4/2013 | Raffle | G02B 27/0101 |
| | | | 345/7 |
| 2013/0293586 A1* | 11/2013 | Kaino | G08G 1/005 |
| | | | 345/633 |
| 2014/0078176 A1* | 3/2014 | Kim | G06F 3/017 |
| | | | 345/633 |
| 2014/0306874 A1* | 10/2014 | Finocchio | G06F 3/017 |
| | | | 345/156 |
| 2015/0243079 A1* | 8/2015 | Cho | G02B 27/017 |
| | | | 345/633 |

* cited by examiner

HEAD-MOUNTED DISPLAY, METHOD OF CONTROLLING HEAD-MOUNTED DISPLAY AND COMPUTER PROGRAM TO MEASURE THE DISTANCE FROM A USER TO A TARGET

BACKGROUND

1. Technical Field

The present invention relates to a technology for a head-mounted display.

2. Related Art

Head-mounted displays (hereinafter referred to as HMDs) which are displays mounted on heads are known. For example, the head-mounted displays cause users to view imaginary images by generating image light using liquid crystal displays and light sources and guiding the generated image light to the eyes of the users using projection optical systems or light-guiding plates. As the head-mounted displays, there are two types of displays, that is, a transmissive display enabling a user to view an outside scenery in addition to an imaginary image and a non-transmissive display not enabling a user to view an outside scenery. As the transmissive head-mounted displays, there are optical transmissive and video-transmissive displays.

JP-A-2011-191905 discloses a stereo camera device in which a stereo camera equipped in an automobile images a front automobile and a distance between the own automobile and the front automobile is measured based on a plurality of images captured by the stereo camera according to trigonometry. The stereo camera device improves precision of a distance by changing the resolution of an image captured by the stereo camera according to the magnitude of a distance between the own automobile and the front automobile. JP-A-2000-102040 discloses an electronic stereo camera that performs imaging so that an image sensor with the larger number of pixels acquires color information by further decreasing the number of pixels of one image sensor in binocular lenses than another image sensor and performs imaging so that the image sensor with the smaller number of pixels acquires information in a depth direction so that depth information can be acquired with a simple configuration at low cost.

However, in the technologies disclosed in JP-A-2011-191905 and JP-A-2000-102040, precision of distances to objects included in captured images can be improved. However, for example, since the precision of a measured distance in the periphery of an angle of view deteriorates more than at the center of the angle of view and the precision differs according to a position in a captured image in the image sensor such as a camera, there is a problem that the precision of a measured distance of the periphery of an angle of view in which the precision is bad is desired to be improved. Further, in the technologies for image processing in the related art, it is desirable to improve usability.

SUMMARY

An advantage of some aspects of the invention is to solve the problems described above, and the invention can be implemented as the following forms.

(1) An aspect of the invention provides a head-mounted display. The head-mounted display includes: a distance measurement unit that measures a distance to a target present in a predetermined range; an imaging unit that images the predetermined range and acquires different preliminary information from the measured distance; and a distance decision unit that decides a distance to the target included in a second region based on the preliminary information acquired in regard to the target included in a measured first region when the target is included in the first region and the second region different from the first region in the predetermined range in which the target is imaged. In the head-mounted display according to the aspect of the invention, it is possible to improve precision of the measurement distance to the target included in the second region by setting the measurement distance to the target included in the second region with low precision based on the preliminary information other than the measurement distance using the measurement distance to the target included in the first region with high precision.

(2) In the head-mounted display according to the aspect of the invention, the preliminary information may be color information. In the head-mounted display according to the aspect of the invention, it is possible to improve precision of the measurement distance to the target included in the second region by setting the measurement distance to the target included in the second region with low precision based on the color information using the measurement distance to the target included in the first region with high precision.

(3) In the head-mounted display according to the aspect of the invention, the imaging unit may acquire RGB data as the color information in the predetermined range. The distance decision unit may determine that the target included in the first region and the target included in the second region are the same target when the RGB data of the target included in the second region is a value within the predetermined range based on the RGB data of the target included in the first region, and decides the distance to the target included in the second region. In the head-mounted display according to the aspect of the invention, usability is improved since the RGB data normally used as the color information is adopted.

(4) In the head-mounted display according to the aspect of the invention, the distance decision unit may decide that the distance to the target included in the second region is the same as the distance to the target included in the first region. In the head-mounted display according to the aspect of the invention, it is possible to reduce the process when the distance of the second region is set.

(5) In the head-mounted display according to the aspect of the invention, the distance decision unit may decide the distance to the target included in one of the first and second regions as the distance measured by the distance measurement unit when the target is included in one of the first and second regions and is not included in the other one of the first or second region. In the head-mounted display according to the aspect of the invention, it is possible to specify the distance to the target according to a method in which the precision of the measured distance is high in accordance with the target included in the captured image.

(6) In the head-mounted display according to the aspect of the invention, the first region may be a region on which a center of the imaged predetermined range centers. The second region may be a peripheral region of the first region. In the head-mounted display according to the aspect of the invention, it is possible to also improve the precision of the measurement distance of the region of a part of the captured image in which the precision of the measurement distance is low.

(7) In the head-mounted display according to the aspect of the invention, the second region may be a region which does not overlap with the first region in the imaged predetermined range. In the head-mounted display according to the aspect of the invention, it is possible to also improve the precision of the measurement distance of the region of a part of the captured image in which the precision of the measurement distance is low.

(8) In the head-mounted display according to the aspect of the invention, the first region may be at least a part of the predetermined range imaged at a specific time point and is an acquired region. The second region may be at least a part of the predetermined range imaged at a different time point from the specific time point. In the head-mounted display according to the aspect of the invention, it is possible to estimate the distance to the target present in a non-imaging range other than the captured image at the specific time point. Thus, it is possible to shorten a time in which the distance to the target included in the captured image after the change is measured when the imaging range is changed. It is possible to reduce a burden on a process of measuring the distance to the target included in the captured image after the change.

(9) The head-mounted display according to the aspect of the invention may further include a target storage unit that stores a specific target. The distance decision unit may decide the distance to the target included in the imaged predetermined range by collating the stored specific target in the imaged predetermined range. In the head-mounted display according to the aspect of the invention, it is possible to estimate the distance to the part of the specific target present outside the imaging range in advance. Thus, it is possible to shorten a time necessary to measure the distance to the specific target included in the captured image after the change when the imaging range is changed. It is possible to reduce a burden on a process of measuring the distance to the specific target included in the captured image after the change.

(10) The head-mounted display according to the aspect of the invention may further include an information reception unit that receives information regarding a specific target from another device. The distance decision unit may decide the distance to the target included in the imaged predetermined range by collating the received specific target in the imaged predetermined range. In the head-mounted display according to the aspect of the invention, it is possible to estimate the distance to the part of the specific target present outside the imaging range in advance. Thus, it is possible to shorten a time necessary to measure the distance to the specific target included in the captured image after the change when the imaging range is changed. It is possible to reduce a burden on a process of measuring the distance to the specific target included in the captured image after the change.

(11) In the head-mounted display according to the aspect of the invention, the distance decision unit may estimate at least one of the color information and the distance to the target in a range other than the imaged predetermined range when the stored specific target is not included in the imaged predetermined range. In the head-mounted display according to the aspect of the invention, it is possible to estimate the distance to the part of the specific target present outside the imaging range or the color information regarding the specific target in advance. Thus, it is possible to shorten a time necessary to measure the distance to the specific target included in the captured image after the change or specify the color information regarding the specific target when the imaging range is changed. It is possible to reduce a burden on a process of measuring the distance to the specific target included in the captured image after the change and specifying the color information regarding the specific target.

(12) The head-mounted display according to the aspect of the invention may further include a visual line detection unit that detects a visual line direction of a user. The imaged predetermined range may be set based on the detected visual line direction. In the head-mounted display according to the aspect of the invention, the imaging range captured by the imaging unit is changed according to the detected visual line direction of the user. Therefore, the usability of the user is improved since the captured image approaches more the outside scenery viewed by the user.

All of the plurality of constituent elements according to the aspects of the invention described above are not requisites. To resolve some or all of the problems or achieve some or all of the above-described advantages described in the present specification, some of the constituent elements among the plurality of constituent elements can be appropriately changed, deleted, or replaced with other new constituent elements or some of the defined content can be deleted. To resolve some or all of the above-described problems or achieve some or all of the above-described advantages described in the present specification, some or all of the technical features included in the aspects of the invention described above can be combined with some or all of the technical features included in the other aspects of the invention described above to be implemented as independent aspects of the invention.

For example, an aspect of the invention can be implemented as a device that includes at least one of the distance specifying unit, the imaging unit, and the distance specifying unit. That is, the device may or may not include the distance measurement unit. The device may or may not include the imaging unit. The device may or may not include the distance specifying unit. For example, the distance measurement unit may measure the distance to the target present in the predetermined range. For example, the imaging unit may image the predetermined range and acquire the different preliminary information from the measured distance. For example, when the target is included in the first region and the second region different from the first region in the predetermined range in which the target is imaged, the distance specifying unit may decide the distance to the target included in the second region based on the preliminary information acquired in regard to the target included in the measured first region. For example, the device can be implemented as a head-mounted display, but can also be implemented as another device other than the head-mounted display. According to the aspects, it is possible to resolve at least one of the various problems such as an improvement and simplification of operability of the device, integration of the device, and an improvement in the convenience of the user using the device. Some or all of the technical features of the head-mounted display according to the aspects described above can be all applied to the device.

The aspects of the invention can also be implemented as various aspects other the head-mounted display. For example, the aspects of the invention can be implemented in aspects of a method of controlling the head-mounted display, an information system including the head-mounted display, a computer program implementing the method of the controlling the head-mounted display and the information system, a recording medium recording the computer program, a data signal implemented in carrier waves including the computer program, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of Head-Mounted Display

Figure 1:
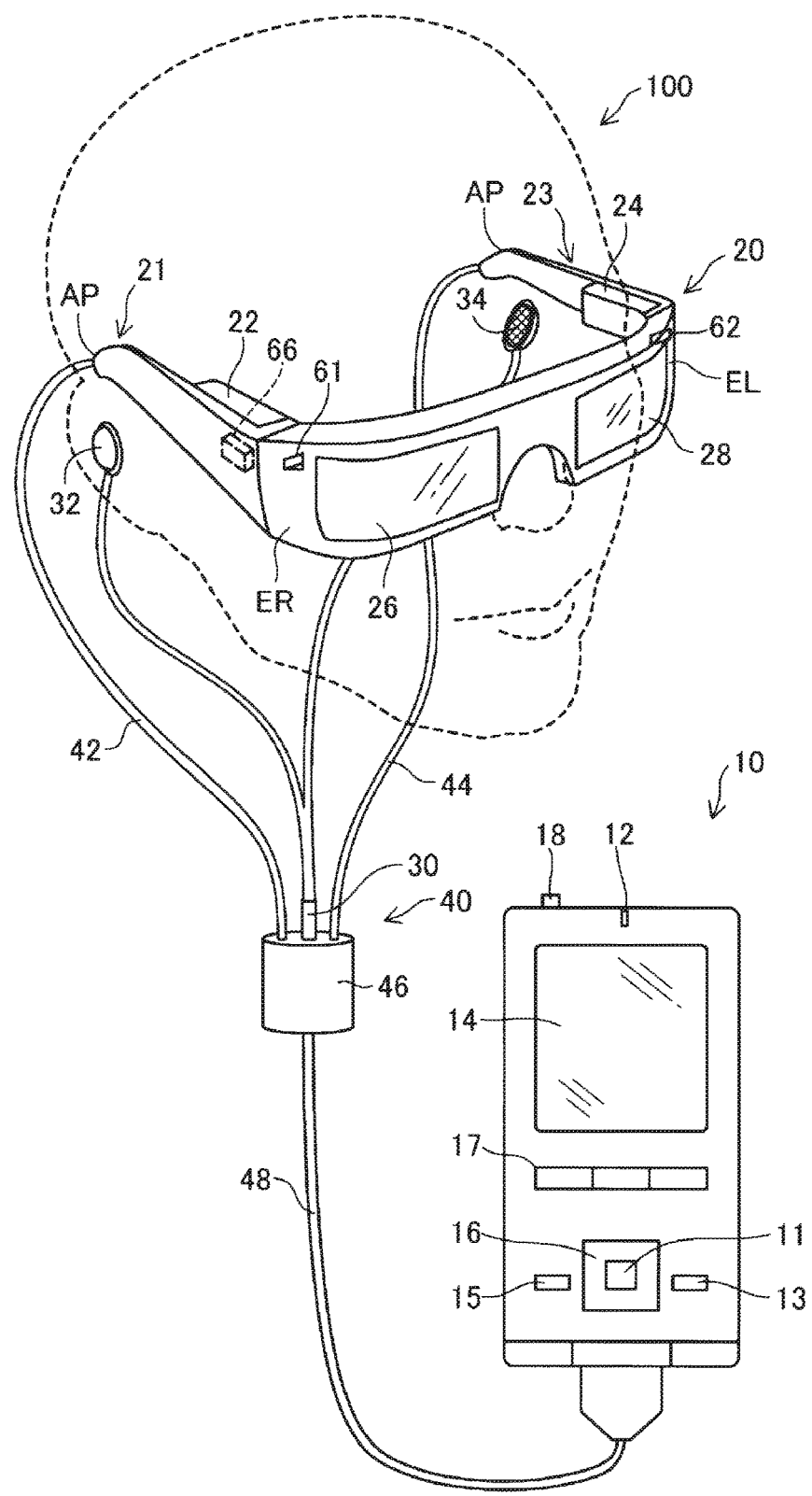
FIG. 1 is a diagram illustrating the outer appearance configuration of a head-mounted display (HMD) according to a first embodiment.

FIG. 1 is a diagram illustrating the outer appearance configuration of a head-mounted display 100 (HMD 100) according to a first embodiment. The HMD 100 is a display that is mounted on a head and is also referred to as a head-mounted display (HMD). The HMD 100 according to the embodiment is an optical transmissive head-mounted display that enables a user to view an imaginary image and directly view an outside scenery simultaneously. In the present specification, an imaginary image viewed by the user with the HMD 100 is also referred to as a "display image" for convenience.

The HMD 100 includes an image display unit 20 that enables the user to view an imaginary image when the HMD 100 is mounted on the head of the user and a control unit 10 (controller 10) that controls the image display unit 20.

The image display unit 20 is a mounted body that is mounted on the head of the user and has a glasses shape in the embodiment. The image display unit 20 includes a right holding unit 21, a right display driving unit 22, a left holding unit 23, a left display driving unit 24, a right optical image display unit 26, a left optical image display unit 28, a first camera 61, a second camera 62, and a 10-axis sensor 66. The right optical image display unit 26 and the left optical image display unit 28 are disposed to be located in front of the right and left eyes of the user when the image display unit 20 is mounted on the user. One end of the right optical image display unit 26 and one end of the left optical image display unit 28 are mutually connected at a position corresponding to the middle of the forehead of the user when the image display unit 20 is mounted on the user.

The right holding unit 21 is a member formed to extend from an end portion ER which is the other end of the right optical image display unit 26 to a position corresponding to a temporal region of the user when the image display unit 20 is mounted on the user. Similarly, the left holding unit 23 is a member formed to extend from an end portion EL which is the other end of the left optical image display unit 28 to a position corresponding to a temporal region of the user when the image display unit 20 is mounted on the user. The right holding unit 21 and the left holding unit 23 hold the image display unit 20 on the head of the user like the temples (bows) of glasses.

The right display driving unit 22 and the left display driving unit 24 are disposed on opposite sides to the head of the user when the image display unit 20 is mounted on the user. Hereinafter, the right holding unit 21 and the left holding unit 23 are also simply referred to as "holding units" collectively, the right display driving unit 22 and the left display driving unit 24 are also simply referred to as "display driving units" collectively, and the right optical image display unit 26 and the left optical image display unit 28 are also simply referred to as "optical image display units" collectively.

The display driving units 22 and 24 include liquid crystal displays 241 and 242 (hereinafter also referred to as "LCDs 241 and 242") and projection optical systems 251 and 252 (see FIG. 2). The details of the configurations of the display driving units 22 and 24 will be described below. The optical image display units 26 and 28 serving as optical members include light-guiding plates 261 and 262 (see FIG. 2) and light adjustment plates. The light-guiding plates 261 and 262 are formed of a resin material with a light transmission property or the like and guide image light output from the display driving units 22 and 24 to the eyes of the user. The light adjustment plates are optical elements with thin plate shapes and are disposed to cover the outer sides of the image display units 20 which are opposite sides to the eye side of the user. The light adjustment plates protect the light-guiding plates 261 and 262 and suppress damage, adhesion of dirt, or the like of the light-guiding plates 261 and 262. By adjusting light transmittance of the light adjustment plates and thus adjusting the amount of light entered from the outside to the eyes of the user, it is possible to adjust easiness of view of an imaginary image. Further, the light adjustment plates can be omitted.

The first camera 61 and the second camera 62 image an outside scenery. The first camera 61 and the second camera 62 are disposed at different positions of the image display unit 20. The first camera 61 is disposed at the end portion ER which is the other end of the right optical image display unit 26 in the head direction of the user when the image display unit 20 is mounted on the user. Similarly, the second camera 62 is disposed at the end portion EL which is the other end of the left optical image display unit 28 in the head direction of the user when the image display unit 20 is mounted on the head of the user. In the embodiment, the first camera 61 and the second camera 62 are disposed to be line-symmetric with respect to a central line passing a position which is the center of the image display unit 20 and at which one end of the right optical image display unit 26 and one end of the left optical image display unit 28 are connected. The first camera 61 and the second camera 62 acquire imaged outside scenery as RGB (RED, GREEN, BLUE) data. Hereinafter, the first camera 61 and the second camera 62 are simply referred to as the cameras 61 and 62 together. The first camera 61 and the second camera 62 may perform imaging at different positions or in different directions. In other embodiments, directions in which or positions at which the first camera 61 and the second camera 62 are disposed can be modified variously.

The 10-axis sensor 66 is a sensor that detects acceleration (3 axes), angular velocities (3 axes), terrestrial magnetism (3 axes), and atmospheric pressure (1 axis). The 10-axis sensor 66 is built near the right display driving unit 22 of the image display unit 20 and detects a motion or position of the head of the user when the image display unit 20 is mounted on the head of the user. In the embodiment, the 10-axis sensor 66 is used to specify the direction of the head of the user. In other embodiments, however, a gyro sensor detecting only angular velocities (3 axes) may be used instead of the 10-axis sensor 66.

The image display unit 20 further includes a connection unit 40 connecting the image display unit 20 to the control unit 10. The connection unit 40 includes a body cord 48 connected to the control unit 10, a right cord 42, a left cord 44, and a connection member 46. The right cord 42 and the left cord 44 are two branched cords of the body cord 48. The right cord 42 is inserted into the casing of the right holding unit 21 from a front end AP of the right holding unit 21 in its extension direction to be connected to the right display driving unit 22. Similarly, the left cord 44 is inserted into the casing of the left holding unit 23 from a front end AP of the left holding unit 23 in its extension direction to be connected to the left display driving unit 24. The connection member 46 is formed in a branching point of the body cord 48, the right cord 42, and the left cord 44 and has a jack for connecting an earphone plug 30. A right earphone 32 and a left earphone 34 extend from the earphone plug 30.

The image display unit 20 and the control unit 10 transmit various signals via the connection unit 40. Connectors (not illustrated) fitted to each other are formed in the control unit 10 and the end portion of the body cord 48 opposite to the connection member 46. The control unit 10 and the image display unit 20 are connected or disconnected by fitting and releasing the fitting of the connector of the body cord 48 to the connector of the control unit 10. In the right cord 42, the left cord 44, and the body cord 48, for example, a metal cable or an optical fiber can be adopted.

The control unit 10 is a device that controls the HMD 100. The control unit 10 includes a decision key 11, a lighting unit 12, a display switch key 13, a track pad 14, a luminance switch key 15, a direction key 16, a menu key 17, and a power switch 18. The decision key 11 detects a pressing operation and outputs a signal deciding content operated with the control unit 10. The lighting unit 12 notifies an operation state of the HMD 100 in accordance with light emission states. Examples of the operation states of the HMD 100 include ON and OFF of power. As the lighting unit 12, for example, an LED is used. The display switch key 13 detects a pressing operation and outputs, for example, a signal for switching a display mode of a content moving image between 3D and 2D. The track pad 14 detects an operation of a finger of the user on an operation surface of the track pad 14 and outputs a signal according to the detection content. As the track pad 14, any of various track pads of an electrostatic type, a pressure detection type, and an optical type are adopted. The luminance switch key 15 detects a pressing operation and outputs a signal for increasing or decreasing the luminance of the image display unit 20. The direction key 16 detects a pressing operation on a key corresponding to any of the upper, lower, right, and left directions and outputs a signal according to the detection content. The power switch 18 switches a power feeding state to the HMD 100 by detecting a sliding operation of a switch.

Figure 2:
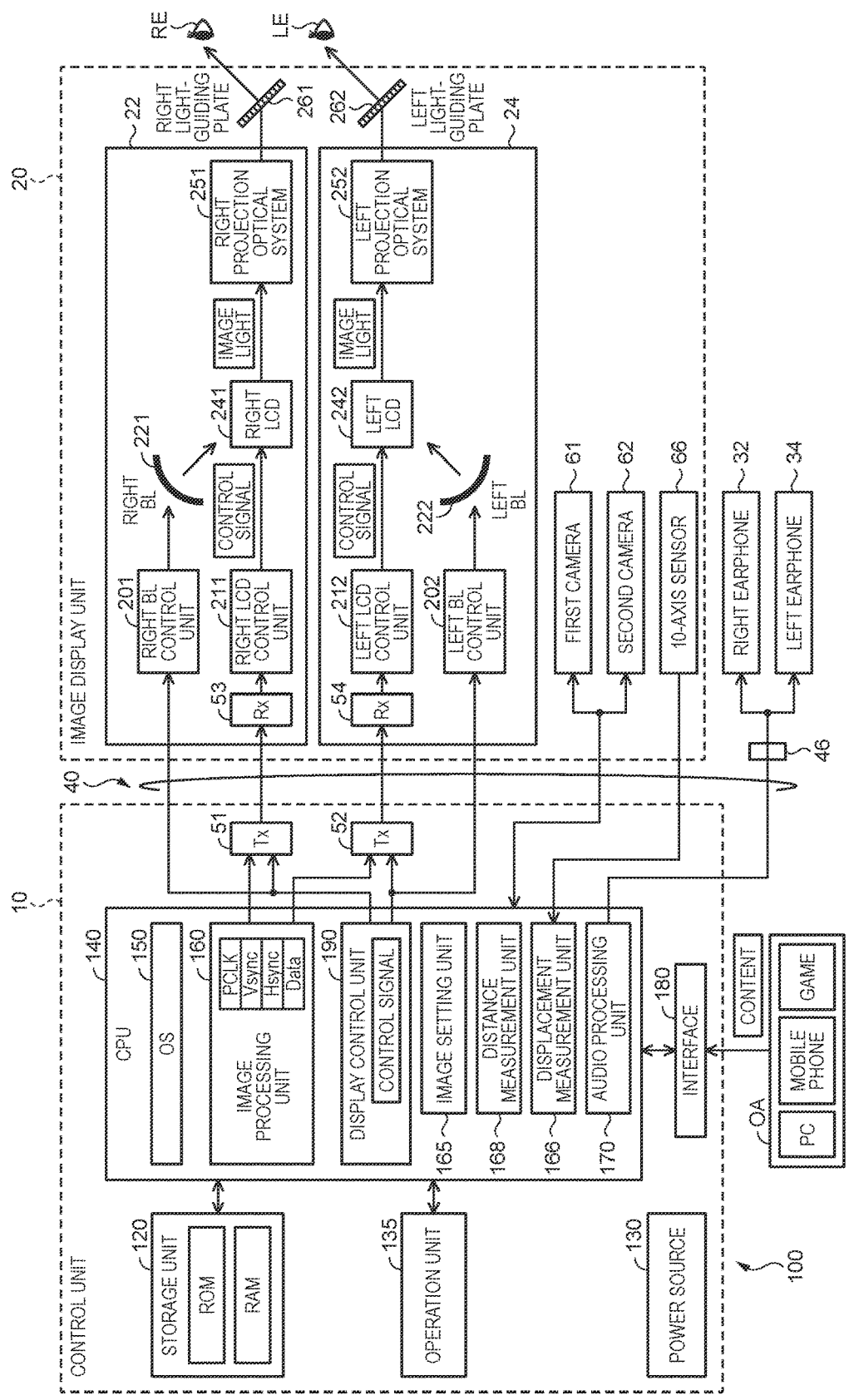
FIG. 2 is a block diagram functionally illustrating the configuration of the HMD according to the first embodiment.

FIG. 2 is a block diagram functionally illustrating the configuration of the HMD 100 according to the first embodiment. As illustrated in FIG. 2, the control unit 10 includes a storage unit 120, a power source 130, an operation unit 135, a CPU 140, an interface 180, a transmission unit 51 (Tx 51), and a transmission unit 52 (Tx 52). The operation unit 135 receives an operation performed by the user, and includes the decision key 11, the display switch key 13, the track pad 14, the luminance switch key 15, the direction key 16, the menu key 17, and the power switch 18. The power source 130 supplies power to each unit of the HMD 100. As the power source 130, for example, a secondary battery can be used.

The storage unit 120 includes a ROM that stores a computer program and a RAM that is used when the CPU 140 performs writing and reading of various computer programs.

The CPU 140 functions as an operation system 150 (OS 150), a display control unit 190, an audio processing unit 170, an image processing unit 160, a displacement measurement unit 166, a distance measurement unit 168, and an image setting unit 165 by reading the computer programs stored in the ROM of the storage unit 120 and performing writing and reading of the computer programs on and from the RAM of the storage unit 120.

The display control unit 190 generates control signals to control the right display driving unit 22 and the left display driving unit 24. Specifically, the display control unit 190 uses the control signals to separately control driving ON/OFF of the right LCD 241 by a right LCD control unit 211, driving ON/OFF of a right backlight 221 by a right backlight control unit 201, driving ON/OFF of the left LCD 242 by a left LCD control unit 212, and driving ON/OFF of a left backlight 222 by a left backlight control unit 202. Accordingly, the display control unit 190 control generation and emission of image light in accordance with each of the right display driving unit 22 and the left display driving unit 24. For example, the display control unit 190 causes both of the right display driving unit 22 and the left display driving unit 24 to generate image light, causes only one of the right display driving unit 22 and the left display driving unit 24 to generate image light, or causes none of the right display driving unit 22 and the left display driving unit 24 to generate image light. Generating the image light is also referred to as "displaying an image".

The display control unit 190 transmits the control signals for the right LCD control unit 211 and the left LCD control unit 212 via the transmission units 51 and 52. The display control unit 190 transmits the control signals for the right backlight control unit 201 and the left backlight control unit 202.

The image processing unit 160 acquires an image signal included in content. The image processing unit 160 separates a synchronization signal such as a vertical synchronization signal VSync or a horizontal synchronization signal HSync from the acquired image signal. The image processing unit 160 generates a clock signal PCLK using a phase locked loop (PLL) circuit or the like (not illustrated) according to a period of the separated vertical synchronization signal VSync or horizontal synchronization signal HSync. The image processing unit 160 converts an analog image signal from which the synchronization signal is separated into a digital image signal using an A/D conversion circuit or the like (not illustrated). Thereafter, the image processing unit 160 stores the converted digital image signal in a DRAM inside the storage unit 120 for each frame as image data (RGB data) of a target image. The image processing unit 160 may perform image processing such as a resolution conversion process, various color tone correction processes such as luminance and saturation, a keystone correction process on the image data, as necessary.

The image processing unit 160 transmits the generated clock signal PCLK, the vertical synchronization signal VSync, the horizontal synchronization signal HSync, and the image data stored in the DRAM inside the storage unit 120 via the transmission units 51 and 52. The image data transmitted via the transmission unit 51 is also referred to as "right-eye image data" and the image data transmitted via the transmission unit 52 is also referred to as "left-eye image data". The transmission units 51 and 52 function as transceivers that perform serial transmission between the control unit 10 and the image display unit 20.

The audio processing unit 170 acquires an audio signal included in the content, amplifies the acquired audio signal, and supplies the audio signal to a speaker (not illustrated) of the right earphone 32 and a speaker (not illustrated) of the left earphone 34 connected to the connection member 46. For example, when a Dolby (registered trademark) system is adopted, the audio signal is subjected to a process so that a different sound with a changed frequency or the like are output from each of the right earphone 32 and the left earphone 34.

The displacement measurement unit 166 calculates a displacement amount of the position and the direction of the image display unit 20 at a current time point using the position and the direction of the image display unit 20 at a specific time point as references by using acceleration and the like detected by the 10-axis sensor 66.

The distance measurement unit 168 measures a distance of a target included in a peripheral portion distant from a central portion of an angle of view in a captured image at the current time point, using the displacement amount of the image display unit 20 calculated by the displacement measurement unit 166 and captured images of the cameras 61 and 62 at the specific time point and the current time point. The distance measurement unit 168 measures not only the distance from the captured images at the specific time point and the current time point different on a time axis but also a distance of a target included in a peripheral portion of a captured image using the RGB data of the central portions of the captured images of the cameras 61 and 62 at a specific time point which is one point on the time axis.

Figure 3:
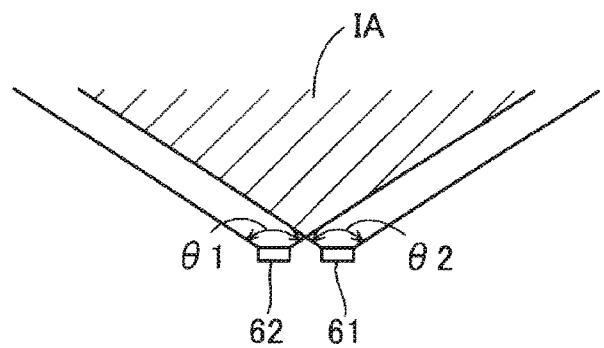
FIG. 3 is a schematic diagram illustrating angles of view of cameras and a range of captured images captured by the cameras.

Specifically, the distance measurement unit 168 measures a distance to a target included in a first region which is a central portion of a captured image with respect to a first image captured by the first camera 61 and a second image captured by the second camera 62 at a specific time point by trigonometry. FIG. 3 is a schematic diagram illustrating angles of view of the cameras 61 and 62 and a range of captured images captured by the cameras 61 and 62. In FIG. 3, an angle of view θ1 of the first camera 61 and an angle of view θ2 of the second camera 62 are illustrated. In a captured image of one camera, the distance measurement unit 168 may not measure a distance to a target included in the captured image using trigonometry. Therefore, it is possible to measure a distance to a target included in an imaging range IA (a range hatched in FIG. 3) which can be imaged by the first camera 61 and the second camera 62 by overlapping the angle of view θ1 of the first camera 61 and the angle of view θ2 of the second camera 62.

The image setting unit 165 performs various kinds of setting on an image (display image) displayed on the image display unit 20. For example, the image setting unit 165 sets the display position of a display image, the size of a display image, the luminance of a display image, and the like or sets right-eye image data and left-eye image data so that a parallax is formed to enable the user to stereoscopically view a display image. The image setting unit 165 generates a virtual image as an outside scenery viewed by the user using a captured image of the first camera 61 and a captured image of the second camera 62. In the embodiment, the position of a right eye RE and the position of a left eye LE of the user are different from the disposition position of the first camera 61 and the disposition position of the second camera 62. Therefore, the image setting unit 165 generates a virtual image viewed by the user by fixing the position of the right eye RE and the position of the left eye LE of the user in advance using the position and the direction of the first camera 61 and the position and the direction of the second camera 62 with respect to the image display unit 20. In the embodiment, the generated virtual image is an image of the outside scenery set to be viewed by the user when the user on which the image display unit 20 is mounted faces the front side. In another embodiment, a visual line direction of a user may be specified by imaging the eyes of the user and the image setting unit 165 may generate a virtual image according to the specified visual line direction of the user.

Figure 4:
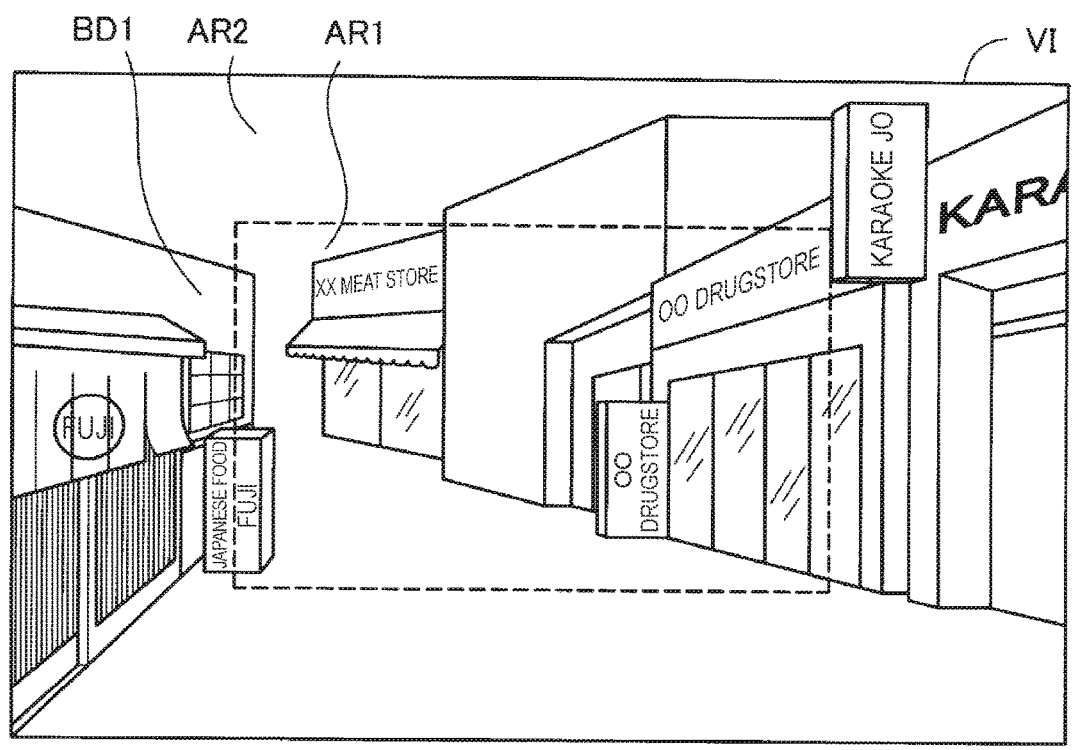
FIG. 4 is a diagram illustrating a virtual image generated by an image setting unit and set to be viewed by a user.

FIG. 4 is a diagram illustrating a virtual image VI generated by the image setting unit 165 and set to be viewed by the user. The image setting unit 165 splits the virtual image VI into a first region AR1 which is a predetermined region centering on the center of the virtual image VI and a second region AR2 which is a region other than the first region which is a peripheral portion of the first region in the virtual image VI. In an image sensor such as a camera, the precision of a measurement distance at the center of the angle of view is generally high. The precision of a measurement distance decreases away from the center of the angle of view. In the embodiment, the image setting unit 165 changes a method of specifying a distance to a target included in the second region AR2 when a region in which the target included in a captured image is present depending on the case (1) in which the region is only one of the first region AR1 and the second region AR2 or the case (2) in which the region is both of the first region AR1 and the second region AR2. Specifically, the image setting unit 165 sets the distance to the target as a distance measured by the distance measurement unit 168 when the region in which the target included in the captured image is present corresponds to the case (1). The image setting unit 165 sets the distance to the target included in the first region AR1 as a distance measured by the distance measurement unit 168 and specifies the distance to the target included in the second region AR2 based on color information regarding the target included in the first region AR1 when the region in which the target included in the captured image corresponds to the case (2). In the case (2), in the embodiment, the image setting unit 165 sets the distance to the target included in the second region AR2 as the same distance as the distance to the target included in the first region AR1. The image setting unit 165 splits the captured images into a plurality of pixels in RGB data of an outside scenery acquired by the cameras 61 and 62 and distinguishes R, G, and B components in the plurality of pixels as gray scale values of 256 gradations. The image setting unit 165 compares the R, G, and B components of the adjacent pixels to each other. When each component of another adjacent pixel is a gray scale value within a predetermined range using the gray scale value of one pixel as a reference, the image setting unit 165 recognizes this adjacent pixel as a pixel included in the same target. Thereafter, in the case (2), that is, the target included in the first region AR1 and the second region AR2 in the captured image is referred to as an overlapping target.

When the direction or position of the user mounting the image display unit 20 is changed, the image setting unit 165 estimates a distance to the target included in the captured images of the cameras 61 and 62 in advance after the change in the direction or position of the user without being included in the virtual image VI at a specific time point, using distance information of the first region AR1 and the second region AR2 in the virtual image VI at the specific time point. For example, the image setting unit 165 determines that a building BD1 is included in the outermost end portion of the second region AR2 of the virtual image VI at the specific time point using the RGB data which is color information. In this case, the direction of the head of the user is changed from the center of the virtual image VI to the direction of the end portion in which the building BD1 is included. When an image of the same RGB data as the building BD1 is included in the virtual image VI generated from a new captured image, a distance to the building BD1 in which a newly included portion is captured at a specific time point is set. In this way, the image setting unit 165 can estimate a distance to the target captured at a time point subsequent to the specific time point on a time axis in advance, using the captured image at the specific time point. In the embodiment, the image setting unit 165 corresponds to a distance decision unit in SUMMARY.

The interface 180 is an interface that connects any of various external devices OA serving as content supply source to the control unit 10. Examples of the external devices OA include a personal computer (PC), a mobile phone terminal, and a game terminal. As the interface 180, for example, a USB interface, a micro USB interface, or a memory card interface can be used.

The image display unit 20 includes the right display driving unit 22, the left display driving unit 24, the right light-guiding plate 261 serving as the right optical image display unit 26, the left light-guiding plate 262 serving as the left optical image display unit 28, the first camera 61, the second camera 62, and the 10-axis sensor 66.

The right display driving unit 22 includes a reception unit 53 (Rx 53), the right backlight control unit 201 (right BL control unit 201) and the right backlight 221 (right BL 221) functioning as a light source, the right LCD control unit 211 and the right LCD 241 functioning as a display element, and the right projection optical system 251. The right backlight control unit 201 and the right backlight 221 function as a light source. The right LCD control unit 211 and the right LCD 241 function as a display element. The right backlight control unit 201, the right LCD control unit 211, the right backlight 221, and the right LCD 241 are also referred to as an "image light generation unit" collectively.

The reception unit 53 functions as a receiver that performs serial transmission between the control unit 10 and the image display unit 20. The right backlight control unit 201 drives the right backlight 221 based on an input control signal. The right backlight 221 is, for example, an illuminant such as an LED or an electro-luminescence (EL). The right LCD control unit 211 drives the right LCD 241 based on the clock signal PCLK input via the reception unit 53, the vertical synchronization signal VSync, the horizontal synchronization signal HSync, and the right-eye image data. The right LCD 241 is a transmissive liquid crystal panel in which a plurality of pixels are arrayed in a matrix form.

The right projection optical system 251 is configured to include a collimating lens that forms the image light emitted from the right LCD 241 as a light flux in a parallel state. The right light-guiding plate 261 serving as the right optical image display unit 26 guides the image light emitted from the right projection optical system 251 to the right eye RE of the user while reflecting the image light along a predetermined light path. The right projection optical system 251 and the right light-guiding plate 261 are also referred to as a "light-guiding unit" collectively.

The left display driving unit 24 has the same configuration as the right display driving unit 22. The left display driving unit 24 includes a reception unit 54 (Rx 54), the left backlight control unit 202 (left BL control unit 202) and the left backlight 222 (left BL 222) functioning as a light source, the left LCD control unit 212 and the left LCD 242 functioning as a display element, and the left projection optical system 252. The left backlight control unit 202 and the left backlight 222 function as a light source. The left LCD control unit 212 and the left LCD 242 function as a display element. The left backlight control unit 202, the left LCD control unit 212, the left backlight 222, and the left LCD 242 are also referred to as an "image light generation unit" collectively. The left projection optical system 252 is configured to include a collimating lens that forms the image light emitted from the left LCD 242 as a light flux in a parallel state. The left light-guiding plate 262 serving as the left optical image display unit 28 guides the image light emitted from the left projection optical system 252 to the left eye LE of the user while reflecting the image light along a predetermined light path. The left projection optical system 252 and the left light-guiding plate 262 are also referred to as a "light-guiding unit" collectively.

Figure 5:
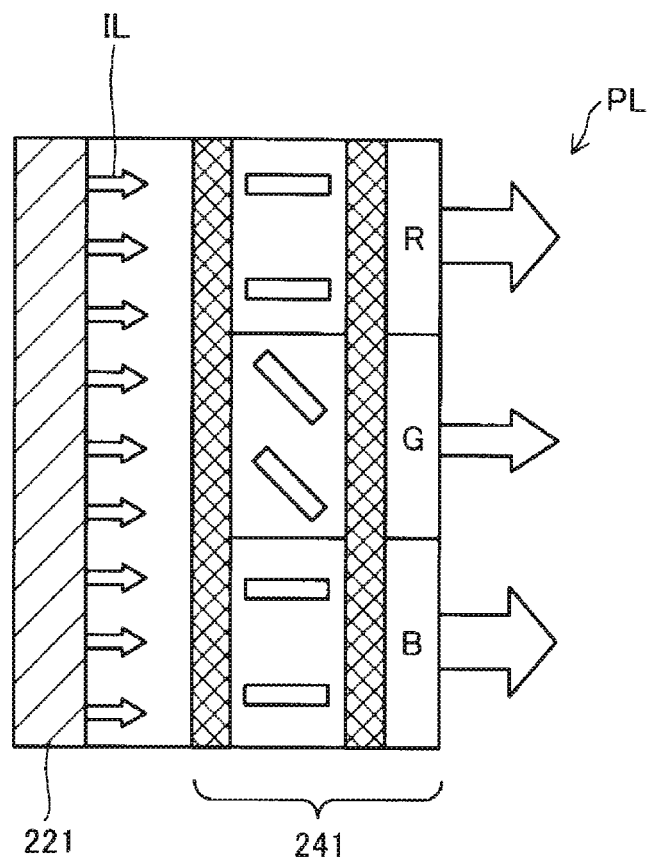
FIG. 5 is a diagram illustrating a form in which image light is emitted by an image light generation unit.

FIG. 5 is a diagram illustrating a form in which image light is emitted by an image light generation unit. The right LCD 241 changes transmittance of light transmitting the right LCD 241 by driving liquid crystal of the positions of the pixels disposed in the matrix form and modulates illumination light IL radiated from the right backlight 221 into effective image light PL indicating an image. The same applies to the left side. In the embodiment, as illustrated in FIG. 4, the backlight type is adopted, but the configuration for emitting image light may be implemented using a front light type or a reflection type.

A-2. Distance Specifying Process

Figure 6:
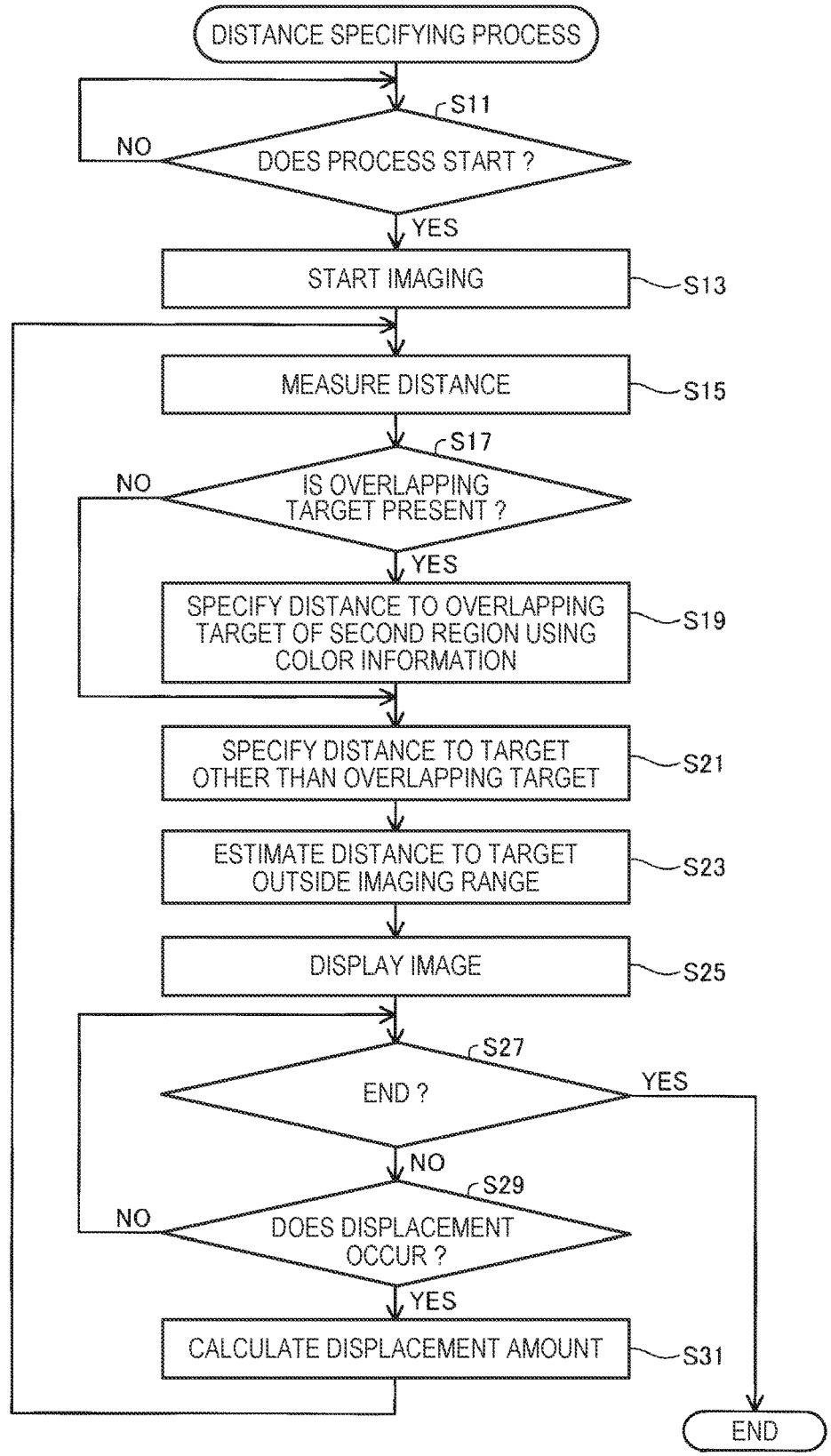
FIG. 6 is a flowchart illustrating a distance specifying process.

FIG. 6 is a flowchart illustrating a distance specifying process. The distance specifying process is a process in which the CPU 140 generates the virtual image VI set to be viewed by the user based on a captured image, measures a distance to a target included in the virtual image VI, splits the generated virtual image VI into the first region AR1 and the second region AR2, and specifies the distance to the target included in the second region AR2 according to whether the target is an overlapping target according to another method.

In the distance specifying process, the CPU 140 first waits for reception of a predetermined operation in which the operation unit 135 starts the distance specifying process (step S11). When the CPU 140 does not receive the predetermined operation of starting the distance specifying process (NO in step S11), the CPU 140 continuously waits for reception of a predetermined operation of starting the distance specifying process. When the CPU 140 receives the predetermined operation of starting the distance specifying process (YES in step S11), the cameras 61 and 62 start imaging an outside scenery (step S13).

The distance measurement unit 168 measures a distance to a target included in the imaging range IA (see FIG. 3) imaged by the first camera 61 and the second camera 62 using trigonometry in the captured image of the first camera 61 and the captured image of the second camera 62 (step S15). Next, the image setting unit 165 determines whether the overlapping target included in both of the first region AR1 and the second region AR2 is present within the imaging range IA (step S17). When the image setting unit 165 determines that the overlapping target is present (YES in step S17), the image setting unit 165 specifies the distance to the overlapping target included in the second region AR2 as the same distance to the overlapping target included in the first region AR1 using the RGB data which is color information (step S19). Next, the image setting unit 165 specifies a distance to a target other than the overlapping target included in the first region AR1 or the second region AR2 as the same distance as the distance measured by the distance measurement unit 168 (step S23). When the image setting unit 165 determines in the process of step S17 that the overlapping target is not present (NO in step S17), the image setting unit 165 performs a process of step S21.

When the image setting unit 165 performs the process of step S23, the image setting unit 165 estimates the distance to the target outside the range of the captured image (step S19). Specifically, as described above, when the image setting unit 165 changes the imaging range of the captured image using the RGB data of the target included in the second region AR2 of the captured image, the image setting unit 165 estimates the distance to the target that is the RGB data within a predetermined value and has continuity with the target included in the captured image before the change in the captured image after the change, using the RGB data of the target included in the captured image before the change as a reference. The estimated range is an appropriately designed factor. For example, a range in which +10% of the vertical and horizontal sides of the angles of view of the cameras 61 and 62 is added may be used. Thereafter, the image setting unit 165 causes the image display unit 20 to display an image based on content acquired from an external device OA or the like in association with the distance information regarding the target included in the virtual image VI (step S21).

Figure 7:
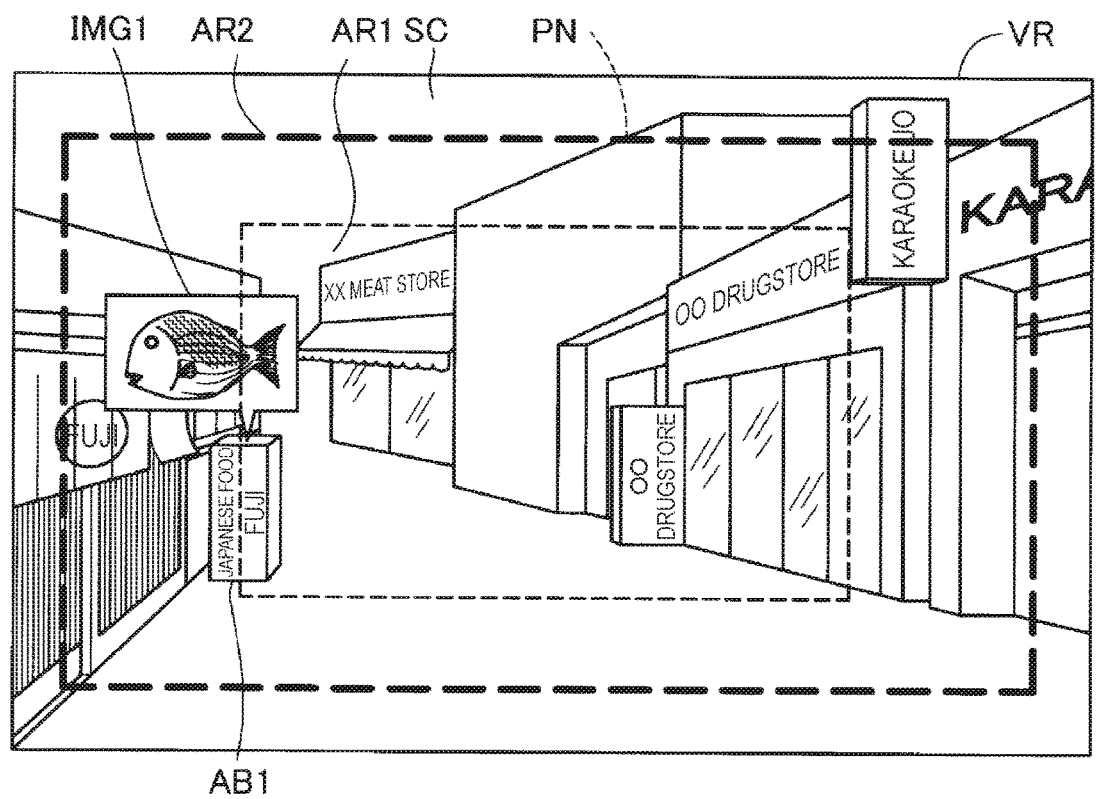
FIG. 7 is a diagram illustrating a viewing field viewed by the user when an image is displayed on an image display unit.

FIG. 7 is a diagram illustrating a viewing field VR viewed by the user when an image is displayed on the image display unit 20. An outside scenery SC viewed by the user and an image IMG1 displayed inside an image displayable region PN which is the maximum region in which an image can be displayed by the image display unit 20 are illustrated in FIG. 7. In the embodiment, the image setting unit 165 sets the virtual image VI as an image viewed by the user when the user faces the front side. Therefore, the virtual image VI and the viewing field VR of the user are nearly identical to each other. As illustrated in FIG. 7, the image setting unit 165 detects a signboard AB1 of a store included in the virtual image VI by pattern matching. Therefore, the image setting unit 165 displays the image IMG1 as a three-dimensional image to be viewed at a position at which the distance to the detected signboard AB1 is the same in the image displayable region PN by setting right-eye image data and left-eye image data to form a parallax. The image IMG1 is associated with the signboard AB1 and is a fish image for indicating that the store of the signboard AB1 sells fish food. In FIG. 7, a dashed line indicating the outer line of the image displayable region PN and a dashed line indicating the outer line of the first region AR1 are illustrated for convenience, but these dashed lines are not viewed by the user.

When the image is displayed on the image display unit 20 in the process of step S21 of FIG. 6, the CPU 140 waits for reception of a predetermined operation in which the operation unit 135 ends the distance specifying process (step S23). When the CPU 140 receives the predetermined operation in which the operation unit 135 ends the distance specifying process (YES in step S23), the distance specifying process ends. When the CPU 140 does not receive the predetermined operation of ending the distance specifying process (NO in step S23), the displacement measurement unit 166 detects changes in the position and the direction of the head of the user mounting the image display unit 20 using acceleration and the like detected by the 10-axis sensor 66 (step S25). When the changes in the position and the direction of the head of the user are not detected (NO in step S25), the CPU 140 waits for the reception operation in which the operation unit 135 ends the distance specifying process (step S23). When the displacement measurement unit 166 detects the change in the position or the direction of the head of the user in the process of step S25 (YES in step S25), the displacement measurement unit 166 calculates the amounts of changes in the position and the direction of the head of the user (step S27). Thereafter, the CPU 140 repeats the processes subsequent to step S15.

Figure 8:
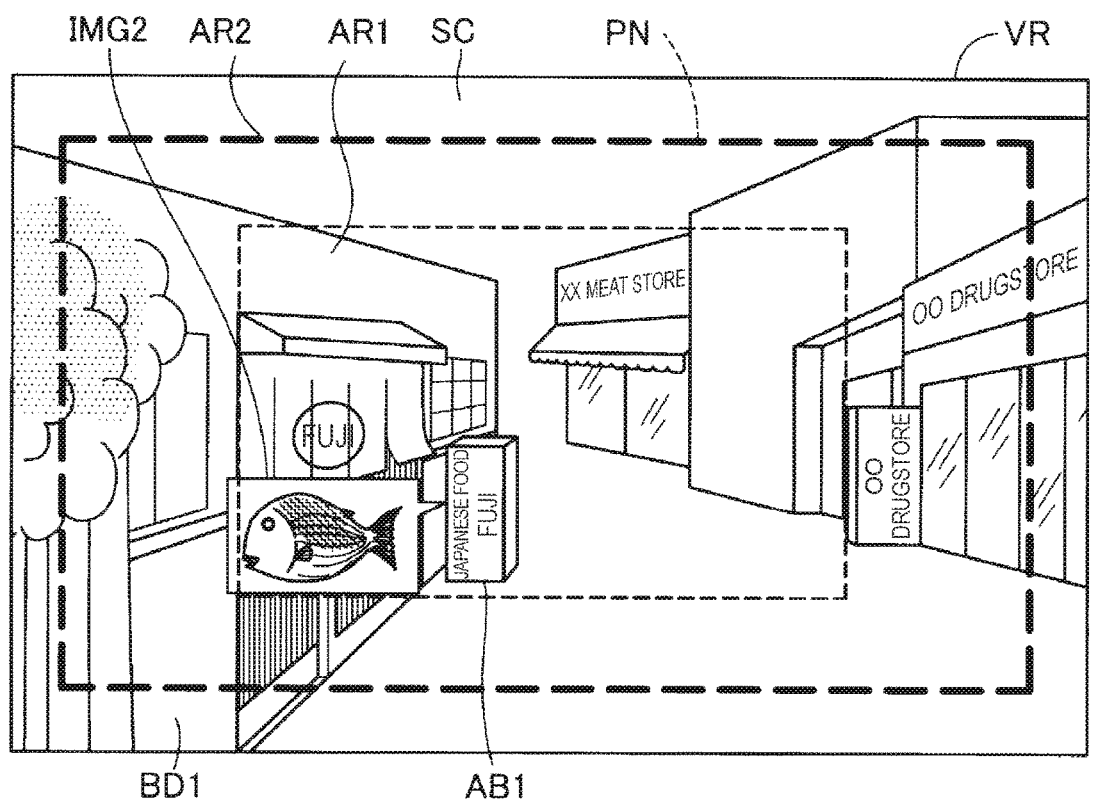
FIG. 8 is a diagram illustrating a viewing field viewed by the user after the direction of the head of the user is changed.

FIG. 8 is a diagram illustrating a viewing field VR viewed by the user after the direction of the head of the user is changed. FIG. 8 illustrates the viewing field VR of the user when the direction of the head of the user is turned left compared to the viewing field VR of the user illustrated in FIG. 7. As illustrated in FIG. 8, an image IMG2 displayed in the image displayable region PN in association with the signboard AB1 has the same content as the image IMG 1 in FIG. 7, but is displayed at a different position. In the embodiment, the image setting unit 165 displays the image based on the content at a position except for the center of the image displayable region PN. In another embodiment, the display position of the image can be modified variously. For example, the image IMG2 may be displayed at the same position as the image IMG1 in FIG. 7 with respect to the outside scenery SC. For the building BD1 which is the store of the signboard AB1, there is a portion newly displayed in the captured images of the cameras 61 and 62 compared to the viewing field VR in FIG. 7. In the embodiment, the image setting unit 165 estimates a distance to a part of the building BD1 newly captured in a virtual image in FIG. 8 in advance based on the RGB data of the virtual image in FIG. 7. Therefore, it is possible to shorten a time until the distance to the part of the building BD1 newly included in the virtual image in FIG. 8 is specified.

As described above, in the HMD 100 according to the embodiment, the image setting unit 165 sets the distance to the overlapping target included in the first region AR1 as a distance measured by the distance measurement unit 168 and specifies the distance to the overlapping target included in the second region AR2 based on different information from the distance information regarding the target included in the first region AR1. Therefore, in the HMD 100 according to the embodiment, by setting the measurement distance to the target included in the second region AR2 with low precision based on information other than the measurement distance using the measurement distance to the target included in the first region AR1 with high precision, it is possible to improve the precision of the measurement distance to the target included in the second region AR2.

In the HMD 100 according to the embodiment, the image setting unit 165 specifies the distance to the overlapping target included in the second region AR2 using the color information as information other than the measurement distance. Therefore, in the HMD 100 according to the embodiment, by setting the measurement distance to the target included in the second region AR2 with low precision based on the color information using the measurement distance to the target included in the first region AR1 with high precision, it is possible to improve the precision of the measurement distance to the target included in the second region AR2.

In the HMD 100 according to the embodiment, since the image setting unit 165 sets the distance to the target included in the second region AR2 as the same distance as the distance to the target included in the first region AR1, it is possible to reduce the process when the distance of the second region AR2 is set.

In the HMD 100 according to the embodiment, the image setting unit 165 sets the distance to the overlapping target included in the second region AR2 using the color information regarding the overlapping target included in the first region AR1 when the overlapping target is included in the captured image. Therefore, for a target other than the overlapping target included in the captured image, the image setting unit 165 sets the distance to the target included in the second region AR2 as the same distance as the distance measured by the distance measurement unit 168. Therefore, in the HMD 100 according to the embodiment, it is possible to specify the distance to the target according to a method in which the precision of the measured distance is high in accordance with the target included in the captured image.

In the HMD 100 according to the embodiment, the first region AR1 is a range that centers on the center of the captured image and the second region AR2 is a peripheral region of the first region AR1 in the captured image. The second region AR2 is the entire region other than the first region AR1 in the captured image. In a camera which is a generally used image sensor, the precision of the measurement distance at the center of the angle of view is high. Therefore, in the HMD 100 according to the embodiment, it is possible to improve the precision of the measurement distance of the periphery of the angle of view in which the precision of the measurement distance is low.

In the HMD 100 according to the embodiment, the image setting unit 165 estimates the distance to the target included in a captured image at a different time point from a specific time point after the position or the direction of the image display unit 20 in which the cameras 61 and 62 are disposed is changed, using the distance information measured from the captured image at the specific time point. Therefore, in the HMD 100 according to the embodiment, it is possible to estimate the distance to the target present in a non-imaging range other than the captured image at the specific time point. Thus, it is possible to shorten a time in which the distance to the target included in the captured image after the change is measured when the imaging range is changed. It is possible to reduce a burden on a process of measuring the distance to the target included in the captured image after the change.

B. Second Embodiment

Figure 9:
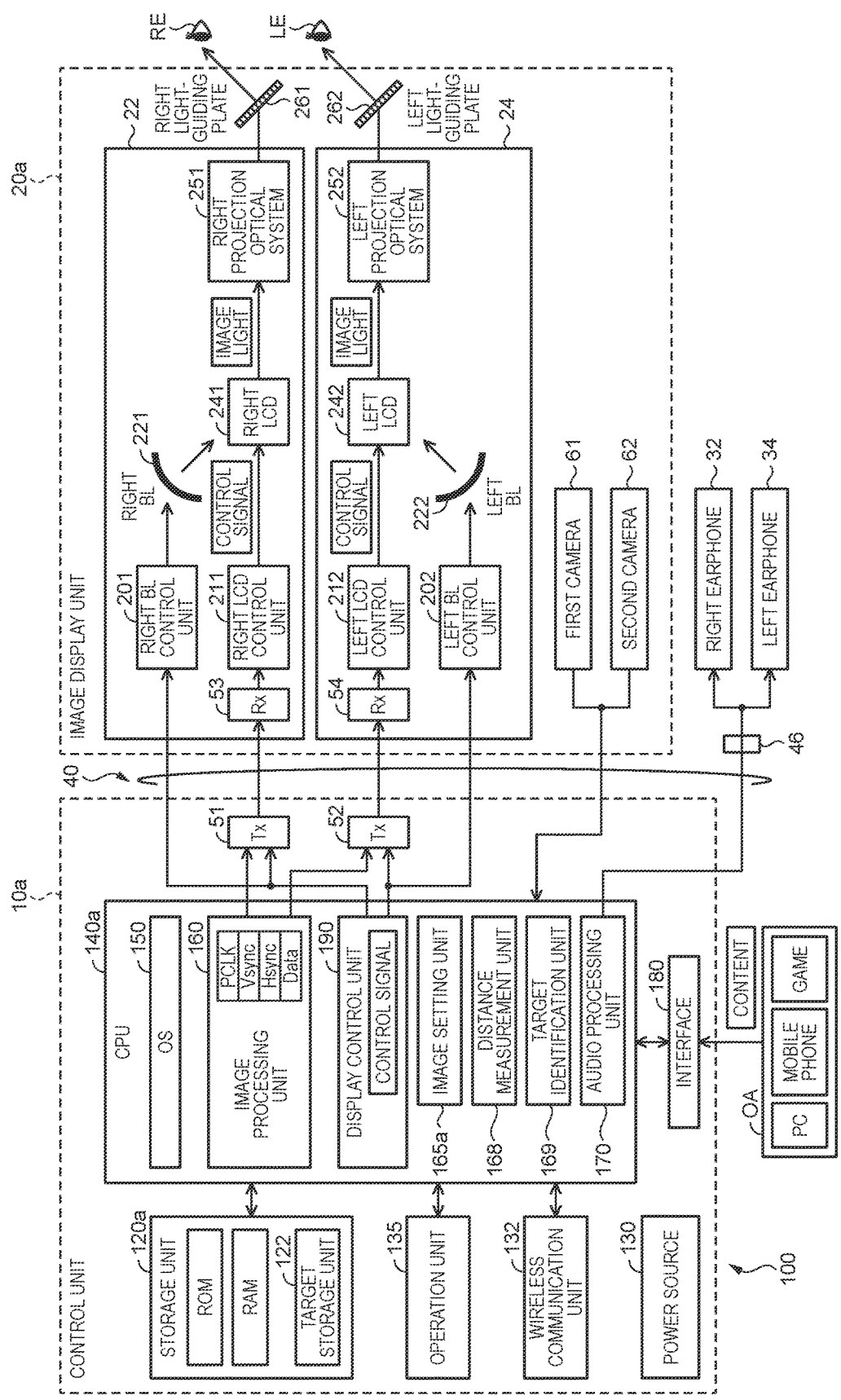
FIG. 9 is a block diagram functionally illustrating the configuration of an HMD according to a second embodiment.

FIG. 9 is a block diagram functionally illustrating the configuration of an HMD 100a according to the second embodiment. The HMD 100a according to the second embodiment is different from the HMD 100 according to the first embodiment in that a control unit 10a includes a wireless communication unit 132, a storage unit 120a includes a target storage unit 122, a CPU 140a includes a target identification unit 169, and the CPU 140a does not include the displacement measurement unit 166, the image display unit 20a does not include the 10-axis sensor 66. The other configuration is the same as that of the HMD 100 according to the first embodiment. Although the details are described below, in the HMD 100a according to the second embodiment, the target identification unit 169 collates whether a target included in a captured image is identical with a specific target stored in the target storage unit 122 or a specific target received via the wireless communication unit 132. When the target included in the captured image is determined to be the same as the specific target, an image setting unit 165a estimates a distance to the specific target present outside a range of captured image based on the image data of the specific target. The wireless communication unit 132 corresponds to an information reception unit in SUMMARY.

The target storage unit 122 stores image data of a plurality of targets as a three-dimensional model. For example, the wireless communication unit 132 performs wireless communication with another device such as a content server, a television, or a personal computer in conformity with a predetermined wireless communication standard such as a wireless LAN or Bluetooth. The wireless communication unit 132 can acquire image data of the target stored in the target storage unit 122 from another device. The target identification unit 169 detects a target regarded as the same target as the image data of the three-dimensional model stored in the target storage unit 122 among captured images according to pattern matching or a statistical identification method. The image setting unit 165a determines that all of the detected targets are included in the captured image when the targets regarded as the same target as the image data of the three-dimensional model are detected in the captured image. The image setting unit 165a estimates some of the targets not included in the captured image when all of the detected targets are not included in the captured image. Accordingly, the image setting unit 165a can estimate a distance to a target not included in the captured image in advance and can measure a distance to a target included in new imaging ranges quickly even when the imaging ranges of the cameras 61 and 62 are changed.

In a distance specifying process according to the second embodiment, the process of step S19 (see FIG. 6) in the distance specifying process according to the first embodiment is different and the other processes are the same as those of the distance specifying process according to the first embodiment. Therefore, in the second embodiment, the process of step S19 different from that of the distance specifying process according to the first embodiment will be described and the other processes will not be described. In step S19 of the distance specifying process according to the second embodiment, the image setting unit 165a estimates the shape of a part of a detected target not included in a captured image and a distance to a part of the target regarding the target detected as the same target as the existing image data in the captured image by the target identification unit 169.

As described above, in the HMD 100a according to the second embodiment, the image setting unit 165a estimates the distance to the part of the specific target present outside the range of the captured image based on the image data of the specific target stored in the target storage unit 122 or acquired via the wireless communication unit 132. Therefore, in the HMD 100a according to the second embodiment, it is possible to estimate the distance to the part of the specific target present outside the imaging range or the color information regarding the specific target in advance. Thus, it is possible to shorten the time necessary to measure the distance to the specific target included in the captured image after the change or specify the color information regarding the specific target when the imaging range is changed. Further, it is possible to reduce a burden on the process of measuring the distance to the specific target included in the captured image after the change and specifying the color information regarding the specific target.

C. Modification Examples

The invention is not limited to the foregoing embodiments, but can also implemented in various forms within the scope of the invention without departing from the gist of the invention and can also be modified as follows, for example.

C-1. Modification Example 1

In the foregoing embodiments, the cameras 61 and 62 which are a plurality of cameras serving as units measuring a distance to an imaged target have been used. However, the units measuring the distance to the captured target are not limited to the stereo cameras according to the foregoing embodiments, but may be modified variously. For example, the HMD 100 may include a monocular camera and a depth sensor that measures a distance. As the depth sensor, a sensor using an infrared ray may be used and various modifications can be realized.

In the foregoing embodiments, the precision of the distance measured up to the target included in the first region AR1 in the virtual image VI generated from the captured images of the cameras 61 and 62 is set to be higher than the precision of the distance measured up to the target included in the second region AR2 in the virtual image VI. However, the goodness and badness of the precision of the measurement distance in the regions can be modified variously. For example, according to an angle of view of a sensor or a stereo camera used to measure a distance, the first region AR1 and the second region AR2 may be set appropriately. A third region in which precision of a measurement distance is lower than the second region AR2 may be set.

In the foregoing embodiments, the color information has been used as different information from the measured distance, but the different information from the measured distance can be modified variously. For example, the different information from the measured distance may be an area of a region in a captured image or a length between any two different points. For example, the area of the region and a length between any two different points may be compared to the size of the three-dimensional model in the image data stored in the target storage unit 122. In the foregoing embodiments, the RGB data has been used as the color information, but the color information used to specify the measurement distance can be modified variously. For example, a YUV system may be used as the color information, luminance, brightness, saturation, hue, gloss of a captured target, or the like may be used. As the color information, a difference in white and black contrast may be simply used as well as the RGB system or the YUV system.

In the foregoing embodiments, the image setting unit 165 causes the image based on the content to be displayed as a stereoscopic image in the image displayable region PN to be viewed by the user using the distance to the target included in the measured captured image, but the image may not necessarily be displayed. The distance to the target included in the imaging range can be measured with high precision irrespective of whether the image is displayed, and thus the invention may be used to measure a distance to a specific target.

In the foregoing embodiments, the second region AR2 is a peripheral region which does not overlap with the first region AR1, but the definition of the peripheral region of the first region AR1 can be modified variously. For example, a part inside the second region AR2 may partially overlap with a region outside the first region AR1. The peripheral region of the first region AR1 may be a region outside the first region AR1 with respect to the center of an angle of view and may be a region in which parts are adjacent to each other or overlap with each other. When the precision of the measured distance is high at a portion other than the center of the angle of view, a peripheral region of the imaging range in which the precision of the measured distance is high may be set as the peripheral region of the first region AR1.

In the foregoing embodiments, the example of the image displayed on the image display unit 20 in the distance specifying process has been described, but the method of displaying the image using the specified distance can be modified variously. As a method of displaying an image, for example, when an imaged target is an automobile and a body color of the target automobile is viewed as a different color from the color at a current time by the user, a different color may overlap as an image in a region recognized as the automobile. In this case, the region of the automobile with the different color overlapped is viewed by the user as a different color in which the body color of the automobile overlaps with the color displayed as the image. The image setting unit 165 may allow the user to view a color corresponding to an unevenness of the body of an automobile by causing the RGB data of the pixels at the position overlapping with the body of the automobile to be different in order to express shade or the like for indicating a perspective in the unevenness or the like of the body of the automobile using the specified distance information. The image setting unit 165 may allow the user to view shade of light reflected from the body of an automobile by setting gloss or luminance variously in order to indicate reflection of light such as illumination or sunlight. In this case, by improving the precision of the specified distance in the invention, it is possible to allow the user to view more real information.

In the foregoing embodiments, the image setting unit 165 specifies the distance to the overlapping target included in the second region AR2 as the same distance as the distance to the overlapping target included in the first region AR1 using the color information when it is determined that the overlapping target is present. The method of specifying the distance to the overlapping target included in the second region AR2 can be modified variously. For example, when a conversion table is generated in advance for the RGB data acquired from the first camera 61 and the second camera 62 based on the performance or disposition of the first camera 61 and the second camera 62, the image setting unit 165 may specify the distance in consideration of the precision according to the position of the overlapping target in the second region AR2 using the conversion table. For example, when cameras are used as imaging units which may not acquire the different information from the distance information such as the color information at the same timing as the measurement distance instead of the cameras 61 and 62 which are the stereo cameras in the foregoing embodiments, the image setting unit 165 may specify the distance to the overlapping target included in the second region AR2 according to an error of a time-series timing calculated in advance by calculating the error of the time-series timing in advance. As the above-described conversion table, for example, a conversion table may be set using ambient light such as sunlight, characteristics unique to a sensor of a camera or the like, the position and the direction of the camera, the performance of a lens or the like of the camera, a method of distinguishing the first region AR1 from the second region AR2, and balance of luminance between an outside scenery and a display image.

C-2. Modification Example 2

Figure 10:
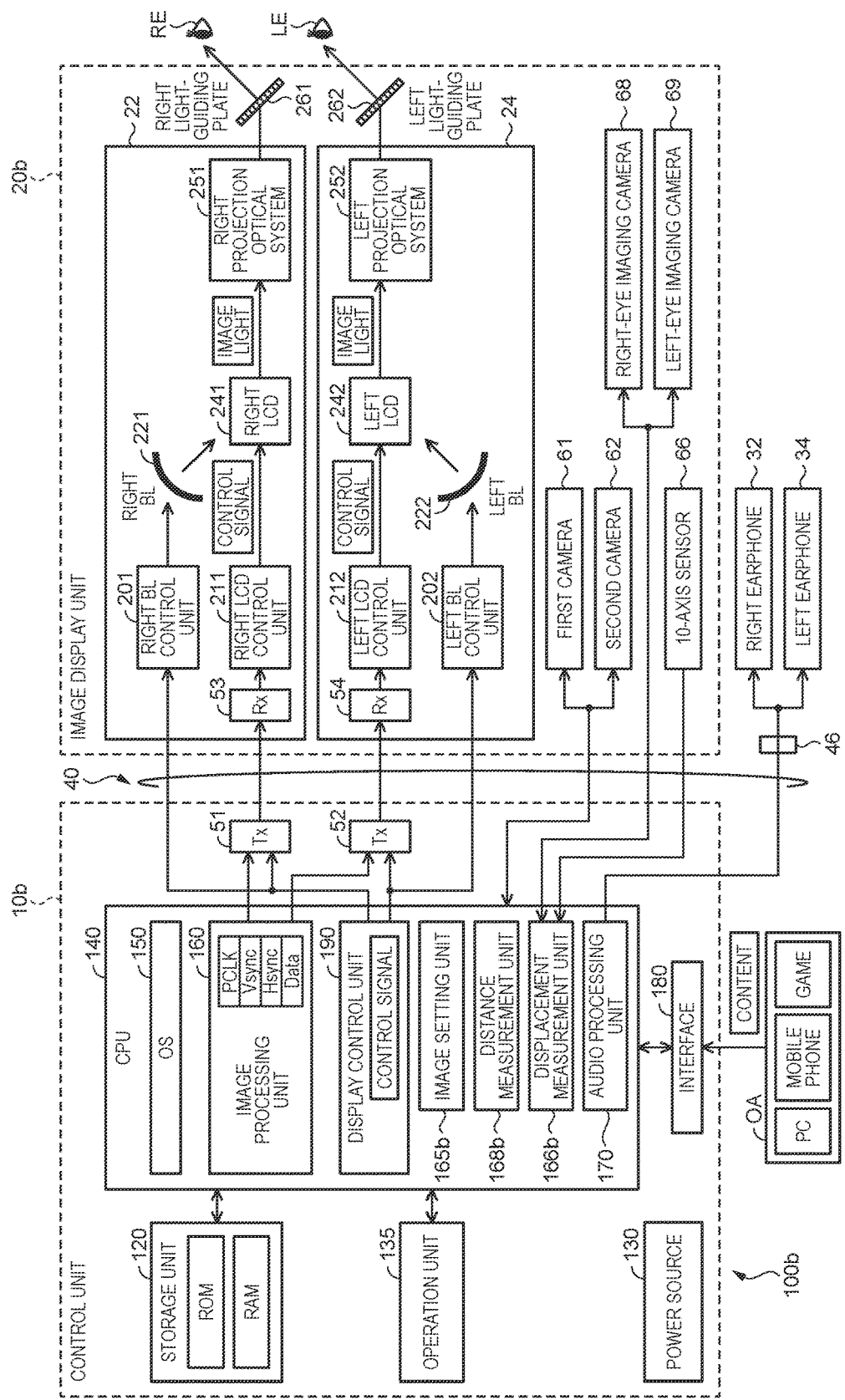
FIG. 10 is a block diagram functionally illustrating the configuration of an HMD according to a modification example.

FIG. 10 is a block diagram functionally illustrating the configuration of an HMD 100b according to a modification example. As illustrated in FIG. 10, an HMD 100b according to the modification example is different from the HMD 100 according to the first embodiment in that an image display unit 20b includes a right-eye imaging camera 68 and a left-eye imaging camera 69. The other configuration is the same as that of the HMD 100 according to the first embodiment. The right-eye imaging camera 68 and the left-eye imaging camera 69 are disposed in the image display unit 20b. The right-eye imaging camera 68 images the right eye of a user and the left-eye imaging camera 69 images the left eye of the user. A displacement measurement unit 169b specifies the positions of movements in the captured images of the right eye and the left eye of the user and specifies the visual line direction of the user. A distance measurement unit 168b and an image setting unit 165b perform measurement of a distance of a target and setting of the distance included in the captured image using a captured image of the visual line direction of the user as a basis. In the modification example, the right-eye imaging camera 68, the left-eye imaging camera 69, and the displacement measurement unit 169b correspond to a visual line detection unit in SUMMARY. In this way, in the HMD 100b according to the modification example, the imaging range imaged by the cameras 61 and 62 is changed according to the visual line direction of a specified user. Therefore, since the captured image more approaches the outside scenery viewed by the user, the convenience for the user is improved.

In the modification example, the right-eye imaging camera 68 and the left-eye imaging camera 69 are used as units detecting the visual line direction of the user, but the units detecting the visual line direction of the user can be modified variously. For example, one of the right-eye imaging camera 68 and the left-eye imaging camera 69 images the right eye or the left eye, and thus the displacement measurement unit 169b may specify the visual line direction of the user. The partial position of movements of the eyes of the user may be specified by sensors using an infrared ray rather than the cameras and the visual line direction of the user may be specified.

C-3. Modification Example 3

In the foregoing embodiments, the control unit 10 includes the operation unit 135, but the type of operation unit 135 may be modified variously. For example, a type of user interface which is the operation unit 135 may be formed as a separate unit from the control unit 10. In this case, since the operation unit 135 is a separate unit from the control unit 10 including the power source 130, the operation unit 135 can be miniaturized so that the operability of the user can be improved. The camera 61 is disposed in the image display unit 20, but the camera 61 may be configured as a separate unit from the image display unit 20 to image an outside scenery SC. The HMD 100 in which both of the CPU 140 and the power source 130 included in the control unit 10 are mounted on the image display unit 20 may be implemented. The HMD 100 can be further miniaturized since there is no controller included as a separate unit from the image display unit 20. When the CPU 140 is mounted on each of the control unit 10 and the image display unit 20, the control unit 10 may be used as a simple controller and the image display unit 20 may be used as a simple display.

For example, the image light generation unit may be configured to include an organic electro-luminescence (EL) display and an organic EL control unit. For example, the image light generation unit may use a liquid crystal on silicon (LCOS: LCoS is a registered trademark), a digital micro mirror device, or the like instead of an LCD. For example, the invention can also be applied to a laser retina projection type HMD 100. The image displayable region PN may be configured by an MEMS shutter type display that opens or closes an MEMS shutter formed in each pixel.

For example, the HMD 100 may be a type of head-mounted display in which an optical image display unit shields only parts of the eyes of the user, in other words, the optical image display unit does not entirely shield the eyes of the user. The HMD 100 may be a so-called monocular head-mounted display. Instead of the HMD 100, a hand-held display of which a position is fixed by the hands of the user like binoculars without being mounted on the head of the user may be used as an image display. The HMD 100 is a binocular optical transmissive device, but the invention can also be applied to, for example, another type of head-mounted display such as a video transmissive display.

The HMD 100 may be used as a display that displays only an image based on an image signal received from another device. Specifically, the HMD 100 may be used as a display corresponding to a monitor of a desktop PC. For example, when image signal is received from the desktop PC, an image may be displayed in the image displayable region PN of the image display unit 20.

The HMD 100 may be used to function as a part of a system. For example, the HMD 100 may be used as a device that performs some of the functions of a system including an airplane. The system in which the HMD 100 is used is not limited to the system including an airplane, but may be a system including an automobile, a bicycle, or the like.

Ear-hook type or head-band type of earphones may be adopted as the earphones or the earphones may be omitted. For example, the HMD 100 may be configured as a head-mounted display mounted on a vehicle such as an automobile or an airplane. For example, the HMD 100 may be configured as a head-mounted display built in a body protection tool such as a helmet.

C-4. Modification Example 4

The configurations of the HMDs 100 according to the foregoing embodiments are merely examples and can be modified variously. For example, the direction key 16 formed in the control unit 10 may be omitted or another operational interface such as an operation stick may be provided in addition to the direction key 16 or the track pad 14. The control unit 10 may be configured such that an input device such as a keyboard or a mouse can be connected and an input can be received from a keyboard or a mouse.

Instead of the image display unit 20 mounted like glasses, for example, an image display unit of another scheme such as an image display unit mounted like a hat may be adopted as the image display unit. The earphones 32 and 34 can appropriately be omitted. In the foregoing embodiments, the LCD or the light source are used as a configuration for generating image light. However, instead of the LCD and the light source, another display element such as an organic EL display may be adopted.

Figure 11A:
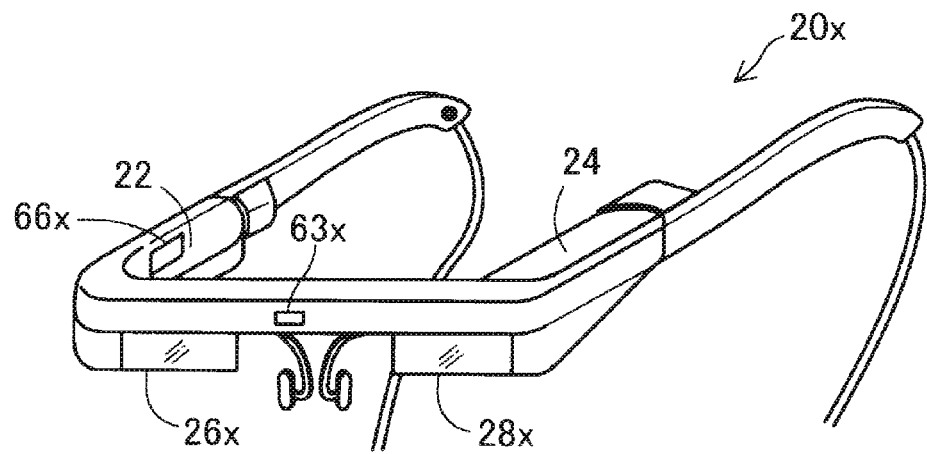
FIGS. 11A and 11B are diagrams illustrating the outer appearance configurations of HMDs according to modification examples.
Figure 11B:
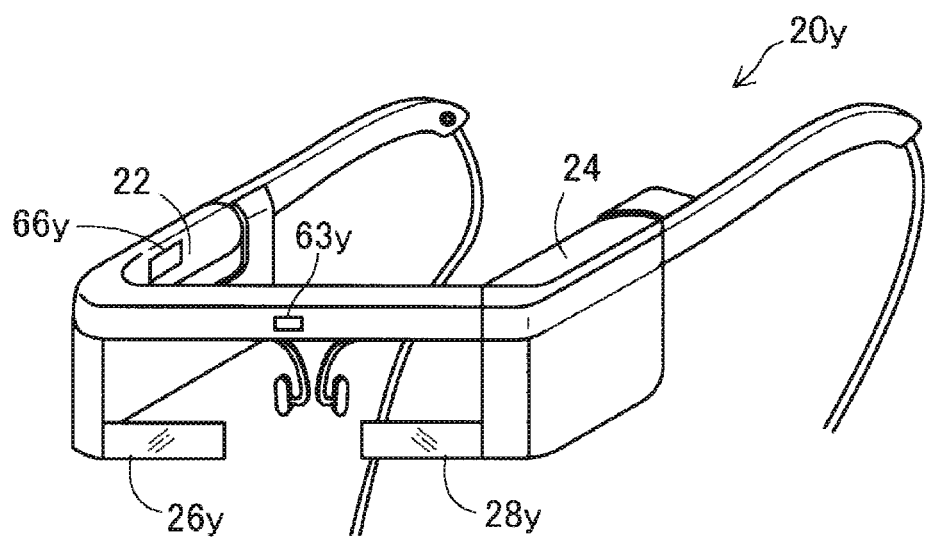

FIGS. 11A and 11B are diagrams illustrating the outer appearance configurations of HMDs according to modification examples. In the case of an example of FIG. 11A, an HMD is different from the HMD 100 illustrated in FIG. 1 in that an image display unit 20x includes a right optical image display unit 26x instead of the right optical image display unit 26 and includes a left optical image display unit 28x instead of the left optical image display unit 28. The right optical image display unit 26x is formed to be smaller than the optical member according to the foregoing embodiments and is disposed diagonally upward to the right eye of the user when an HMD 100x is mounted. Similarly, the left optical image display unit 28x is formed to be smaller than the optical member according to the foregoing embodiments and is disposed diagonally upward to the left eye of the user when the HMD 100x is mounted. In the case of an example of FIG. 11B, an HMD is different from the HMD 100 illustrated in FIG. 1 in that an image display unit 20y includes a right optical image display unit 26y instead of the right optical image display unit 26 and includes a left optical image display unit 28y instead of the left optical image display unit 28. The right optical image display unit 26y is formed to be smaller than the optical member according to the foregoing embodiments and is disposed diagonally downward to the right eye of the user when the head-mounted display is mounted. Similarly, the left optical image display unit 28y is formed to be smaller than the optical member according to the foregoing embodiments and is disposed diagonally downward to the left eye of the user when the head-mounted display is mounted. In this way, it is sufficient that the optical image display units are disposed near the eyes of the user. Any sizes of optical members included in the optical image display units are used, and the HMD 100 in which the optical image display units shield only parts of the eyes of the user, in other words, the optical image display units do not completely shield the eyes of the user can be implemented.

In the foregoing embodiments, the HMD 100 may allow the user to view a two-dimensional image by guiding image light indicating the same image to the right and left eyes of the user or may allow the user to view a three-dimensional image by guiding image light indicating different images to the right and left eyes of the user.

In the foregoing embodiments, a part of a configuration implemented by hardware may be substituted with software. Conversely, a part of a configuration implemented by software may be substituted with hardware. For example, in the foregoing embodiments, the image processing unit 160 or the audio processing unit 170 are implemented when the CPU 140 reads and executes the computer programs. However, these functional units may be implemented by hardware circuits.

When some or all of the functions of the invention are implemented by software, the software (computer program) can be supplied in a form stored in a computer-readable recording medium. In the invention, the "computer-readable recording medium" is not limited to a portable recording medium such as a flexible disc or a CD-ROM, but includes an internal storage device in a computer, such as various RAMS or ROMs or an external storage device fixed to a computer, such as a hard disk.

In the foregoing embodiments, as illustrated in FIGS. 1 and 2, the control unit 10 and the image display unit 20 are formed to have different configurations, but the configurations of the control unit 10 and the image display unit 20 are not limited thereto and can be modified variously. For example, all or some of the configurations formed in the control unit 10 may be formed inside the image display unit 20. The power source 130 according to the foregoing embodiments may be independently formed to be exchangeable or the configurations formed in the control unit 10 may be formed to be duplicated in the image display unit 20. For example, the CPU 140 illustrated in FIG. 2 may be formed in both of the control unit 10 and the image display unit 20. Functions performed by the CPU 140 formed in the control unit 10 and the CPU formed in the image display unit 20 may be separately divided.

The invention is not limited to the foregoing embodiment or the modification examples, but can be implemented with various configurations within the scope of the invention without departing from the gist of the invention. For example, the technical features of the embodiments and the modification examples corresponding to the technical features in the aspects described in SUMMARY can be appropriately replaced or combined to resolve some or all of the above-described problems or achieve some or all of the above-described advantages. When the technical features are not described as requisites in the present specification, the technical features may be appropriately deleted.

The entire disclosure of Japanese Patent Application No. 2015-008301, filed Jan. 20, 2015 is expressly incorporated by reference herein.

What is claimed is:

1. A head-mounted display comprising:
    at least one camera that images a predetermined range and acquires color information; and
    a processor configured to:
        measure a distance to a target present in the predetermined range;
        determine a distance to the target included in a second region based on the color information acquired in regard to the target included in a measured first region when the first region and the second region, which is different from the first region, are included in the predetermined range in which the target is imaged; and
        determine that the target included in the first region and the target included in the second region are the same target based on the color information.

2. The head-mounted display according to claim 1, wherein:
    the at least one camera acquires RGB data as the color information in the predetermined range, and
    the processor determines that the target included in the first region and the target included in the second region are the same target when the RGB data of the target included in the second region is a value within the predetermined range based on the RGB data of the target included in the first region, and decides the distance to the target included in the second region.

3. The head-mounted display according to claim 1, wherein the processor decides that the distance to the target included in the second region is the same as the distance to the target included in the first region.

4. The head-mounted display according to claim 1, wherein the processor decides the distance to the target included in one of the first and second regions as the distance measured when the target is included in one of the first and second regions and is not included in the other one of the first or second region.

5. The head-mounted display according to claim 1,
wherein the first region is a region on which a center of the imaged predetermined range centers, and
wherein the second region is a peripheral region of the first region.

6. The head-mounted display according to claim 5,
wherein the second region is a region which does not overlap with the first region in the imaged predetermined range.

7. The head-mounted display according to claim 1,
wherein the first region is at least a part of the predetermined range imaged at a specific time point and is an acquired region, and
wherein the second region is at least a part of the predetermined range imaged at a different time point from the specific time point.

8. The head-mounted display according to claim 1, further comprising:
a memory that stores a specific target,
wherein the processor decides the distance to the target included in the imaged predetermined range by collating the stored specific target in the imaged predetermined range.

9. The head-mounted display according to claim 8,
wherein the processor estimates at least one of the color information and the distance to the target in a range other than the imaged predetermined range when the stored specific target is not included in the imaged predetermined range.

10. The head-mounted display according to claim 1, wherein the processor:
receives information regarding a specific target from another device,
decides the distance to the target included in the imaged predetermined range by collating the received specific target in the imaged predetermined range.

11. The head-mounted display according to claim 1, wherein:
the processor is configured to detect a visual line direction of a user, and
the imaged predetermined range is set based on the detected visual line direction.

12. A method of controlling a head-mounted display including at least one camera imaging a predetermined range, the method comprising:
measuring a distance to a target present in the imaged predetermined range;
determining a distance to the target included in a second region based on color information that is different from a distance to the target acquired by imaging the target included in a measured first region when the first region and the second region, which is different from the first region, are included in the predetermined range in which the target is imaged; and
determining that the target included in the first region and the target included in the second region are the same target based on the color information.

13. A non-transitory computer-readable storage medium storing a computer program for a head-mounted display including at least one camera imaging a predetermined range, the computer program causing a computer to:
measure a distance to a target present in the imaged predetermined range;
determine a distance to the target included in a second region based on color information that is different from a distance to the target acquired by imaging the target included in a measured first region when the first region and the second region, which is different from the first region, are included in the predetermined range in which the target is imaged; and
determine that the target included in the first region and the target included in the second region are the same target based on the color information.

* * * * *